(12) United States Patent
Lyver et al.

(10) Patent No.: US 11,770,342 B2
(45) Date of Patent: *Sep. 26, 2023

(54) METHODS AND SYSTEMS FOR GATEWAY LOAD BALANCING

(71) Applicant: Shopify Inc., Ottawa (CA)

(72) Inventors: Andre Lyver, Kirkland (CA); Richard Btaiche, Montreal (CA)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,753

(22) Filed: Sep. 17, 2021

(65) Prior Publication Data
US 2022/0006752 A1 Jan. 6, 2022

Related U.S. Application Data

(63) Continuation of application No. 16/779,936, filed on Feb. 3, 2020, now Pat. No. 11,151,524.

(51) Int. Cl.
H04L 47/25 (2022.01)
G06Q 20/02 (2012.01)
H04L 67/1029 (2022.01)
H04L 67/101 (2022.01)
G06Q 30/0272 (2023.01)
G06Q 30/06 (2023.01)
H04L 47/125 (2022.01)
(Continued)

(52) U.S. Cl.
CPC .......... *H04L 47/25* (2013.01); *G06Q 20/027* (2013.01); *G06Q 30/0272* (2013.01); *G06Q 30/06* (2013.01); *H04L 47/125* (2013.01); *H04L 67/101* (2013.01); *H04L 67/1029* (2013.01); *G06Q 20/12* (2013.01); *G06Q 20/306* (2020.05); *H04L 47/12* (2013.01); *H04N 21/2542* (2013.01); *H04N 21/47815* (2013.01)

(58) Field of Classification Search
CPC ....... H04L 47/25; H04L 47/12; H04L 47/125; H04L 69/329; H04L 69/326; H04L 67/1001; H04L 47/762; G06F 9/5088; G06F 9/505; G06F 9/45558
See application file for complete search history.

(56) References Cited

U.S. PATENT DOCUMENTS

| 9,871,744 | B2 * | 1/2018 | Janssens | ............... | H04L 47/125 |
| 2008/0282283 | A1 * | 11/2008 | Hilton | .............. | H04N 21/47815 |
| | | | | | 725/86 |

(Continued)

OTHER PUBLICATIONS

U.S. Office Action, U.S. Appl. No. 16/779,936, filed Apr. 13, 2021.

*Primary Examiner* — Kyung H Shin

(74) *Attorney, Agent, or Firm* — Rowand LLP

(57) ABSTRACT

Methods and systems for load balancing of payment requests among payment gateways by an e-commerce platform. The method may include detecting an anticipated load event and identifying a first payment gateway to be impacted by the anticipated load event, wherein a merchant account is associated with the first payment gateway. The platform may then identify, based on merchant parameters associated with the merchant account, a second payment gateway and, during the anticipated load event, transmit at least some payment requests first to the second payment gateway instead of to the first payment gateway.

21 Claims, 7 Drawing Sheets

(51) Int. Cl.
*H04N 21/478* (2011.01)
*H04N 21/254* (2011.01)
*G06Q 20/30* (2012.01)
*G06Q 20/12* (2012.01)
*H04L 47/12* (2022.01)

(56) References Cited

U.S. PATENT DOCUMENTS

2017/0214738 A1* 7/2017 Agarwal ............... H04L 47/125
2019/0306061 A1* 10/2019 Lesartre ................. H04L 47/25

* cited by examiner

METHODS AND SYSTEMS FOR GATEWAY LOAD BALANCING

CROSS-REFERENCE TO RELATED APPLICATIONS

The present application is a continuation of patent application Ser. No. 16/779,936 filed Feb. 3, 2020, the contents of which are hereby incorporated by reference.

FIELD

The present disclosure relates to computer-implemented e-commerce platforms and, in particular, to methods and systems for balancing payment request load among payment gateways.

BACKGROUND

Over the past decade, online product retailing has become commonplace, to the point where a large percentage of merchants, whether big or small, make products available through an online store. In some cases, merchants may use a third party e-commerce platform that provides a centralized system to enable online resources and facilities for managing retail business. E-commerce platforms provide merchants with a number of services, including payment services. The processing of online payments, whether by credit card, debit card, PayPal™, Apple™ Pay, or the like, often involves sending a payment request to a payment gateway. The payment gateway is a third-party operated gateway that receives diverse payment requests from a number of sources and locations and serves to extract necessary data from each payment request and to format it into a prescribed format for transmission to a payment server operated by a payment processor, such as a credit card company, bank, or the like. The payment gateway may also provide fraud prevention services and other ancillary services in connection with handling payment requests.

Sometimes, a payment gateway may become overwhelmed with payment requests, which can trigger re-tries by the e-commerce platform, or result in time-outs, failures, or excessively long transaction completions. This may result in confused or frustrated purchasers, failed or frustrating sales, dissatisfied merchants, and may give rise to the potential for erroneous double purchases or billing.

BRIEF DESCRIPTION OF THE DRAWINGS

Embodiments will be described, by way of example only, with reference to the accompanying figures wherein.

DETAILED DESCRIPTION

Figure 1:
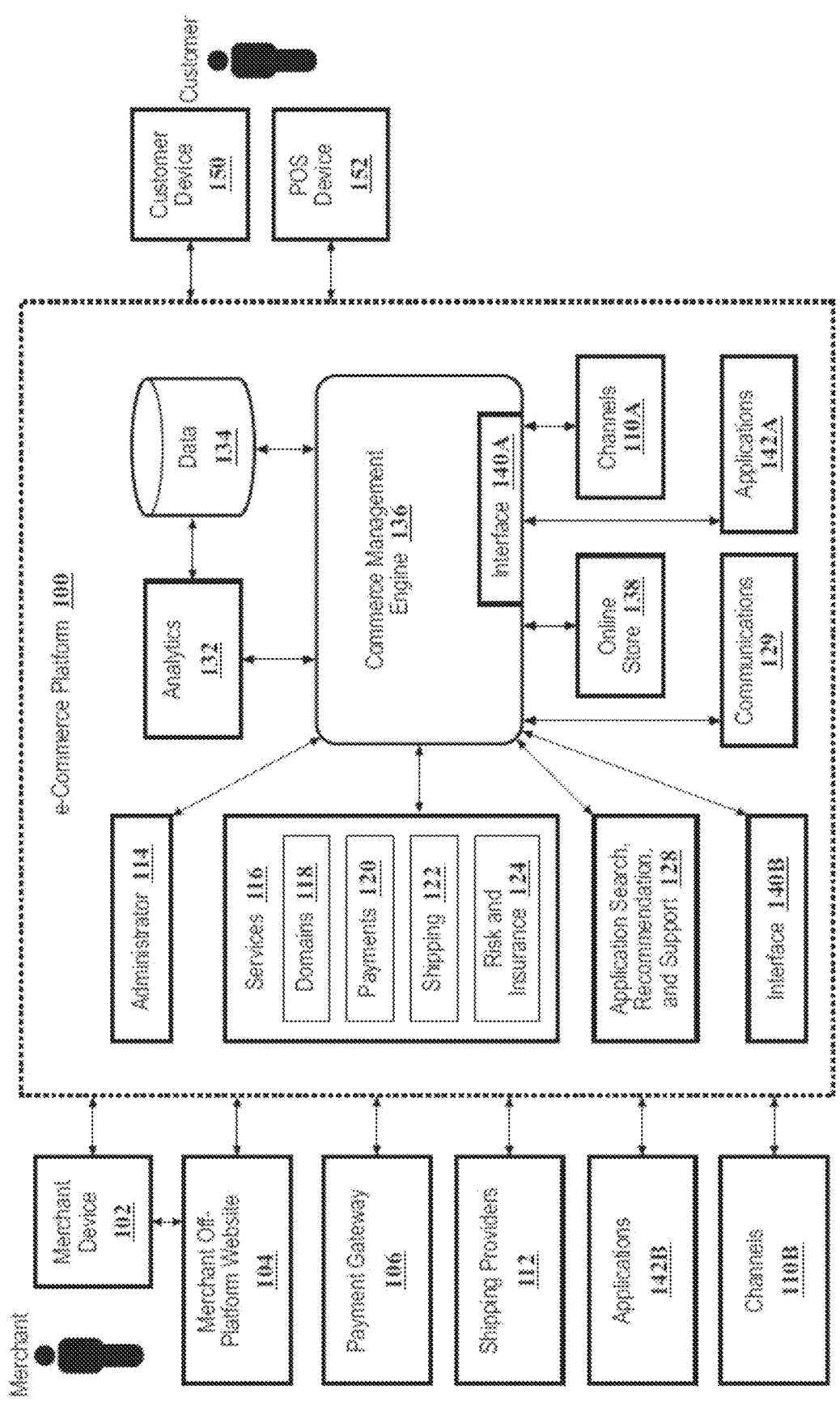
FIG. 1 is a block diagram of an e-commerce platform, according to one embodiment.

In one aspect, the present application describes a computer-implemented method of load balancing payment requests among payment gateways. The method may include determining an anticipated load event; identifying a first payment gateway to be impacted by the anticipated load event, wherein a merchant account is associated with the first payment gateway; identifying, based on merchant parameters associated with the merchant account, a second payment gateway; and during the anticipated load event, transmitting at least some payment requests to the second payment gateway instead of to the first payment gateway.

In some implementations, determining the anticipated load event may include determining that a number of payment requests expected is likely to exceed a threshold level based on a count of active sessions associated with the merchant account.

In some implementations, determining the anticipated load event may include determining that a number of payment requests expected is likely to exceed a threshold level based on a count of active shopping carts associated with the merchant account.

In some implementations, determining the anticipated load event may include determining that a number of payment requests expected is likely to exceed a threshold level based on a count of product items in active shopping carts associated with the merchant account.

In some implementations, determining the anticipated load event may include determining from an external data source that a number of payment requests expected is likely to exceed a threshold level. The external data source may include one of information regarding an advertising campaign launch with respect to the merchant account, information regarding an endorsement announcement with respect to the merchant account, information regarding a seasonal event, or information regarding a load event with respect to another merchant account In some implementations, determining the anticipated load event may include determining that the anticipated load event relates to the merchant account, and wherein identifying the first payment gateway includes determining that the merchant account is associated with the first payment gateway.

In some implementations, identifying the first payment gateway to be impacted by the anticipated load event may include monitoring a health status of the first payment gateway and determining from the health status of the first payment gateway and the anticipated load event that the first payment gateway is incapable of processing the anticipated load event. In some cases, monitoring the health status may include determining a current capacity for the first payment gateway, wherein determining the anticipated load event includes determining a likely quantity of payment requests, and wherein determining that the first payment gateway is incapable of processing the anticipated load event includes determining that the likely quantity of payment requests exceeds the current capacity.

In some implementations, identifying the second payment gateway may include retrieving the merchant parameters associated with the merchant account from memory and determining that the second payment gateway is designated as an alternative payment gateway in the merchant parameters.

In some implementations, identifying the second payment gateway may include determining from the merchant parameters that the merchant account does not have a selected alternative gateway; sending a merchant device associated with the merchant account a message to select an alternative gateway for the anticipated load event; and receiving a response message selecting the second payment gateway. In some cases, the method further includes identifying, from among a plurality of payment gateways, a recommended gateway for the anticipated load event, wherein the message includes the recommended gateway, and wherein the response message includes confirmation of selection of the recommended gateway as the second payment gateway.

In another aspect, the present application describes a system for load balancing payment requests among payment gateways. The system may include a processor; and a memory storing computer-executable instructions that, when executed by the processor, are to cause the processor to determine an anticipated load event; identify a first payment gateway to be impacted by the anticipated load event, wherein a merchant account is associated with the first payment gateway; identify, based on merchant parameters associated with the merchant account, a second payment gateway; and, during the anticipated load event, transmit at least some payment requests first to the second payment gateway instead of to the first payment gateway.

In yet a further aspect, the present application describes a non-transitory computer-readable medium storing processor-executable instructions that, when executed by one or more processors, are to cause the one or more processors to carry out one or more of the methods described herein.

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
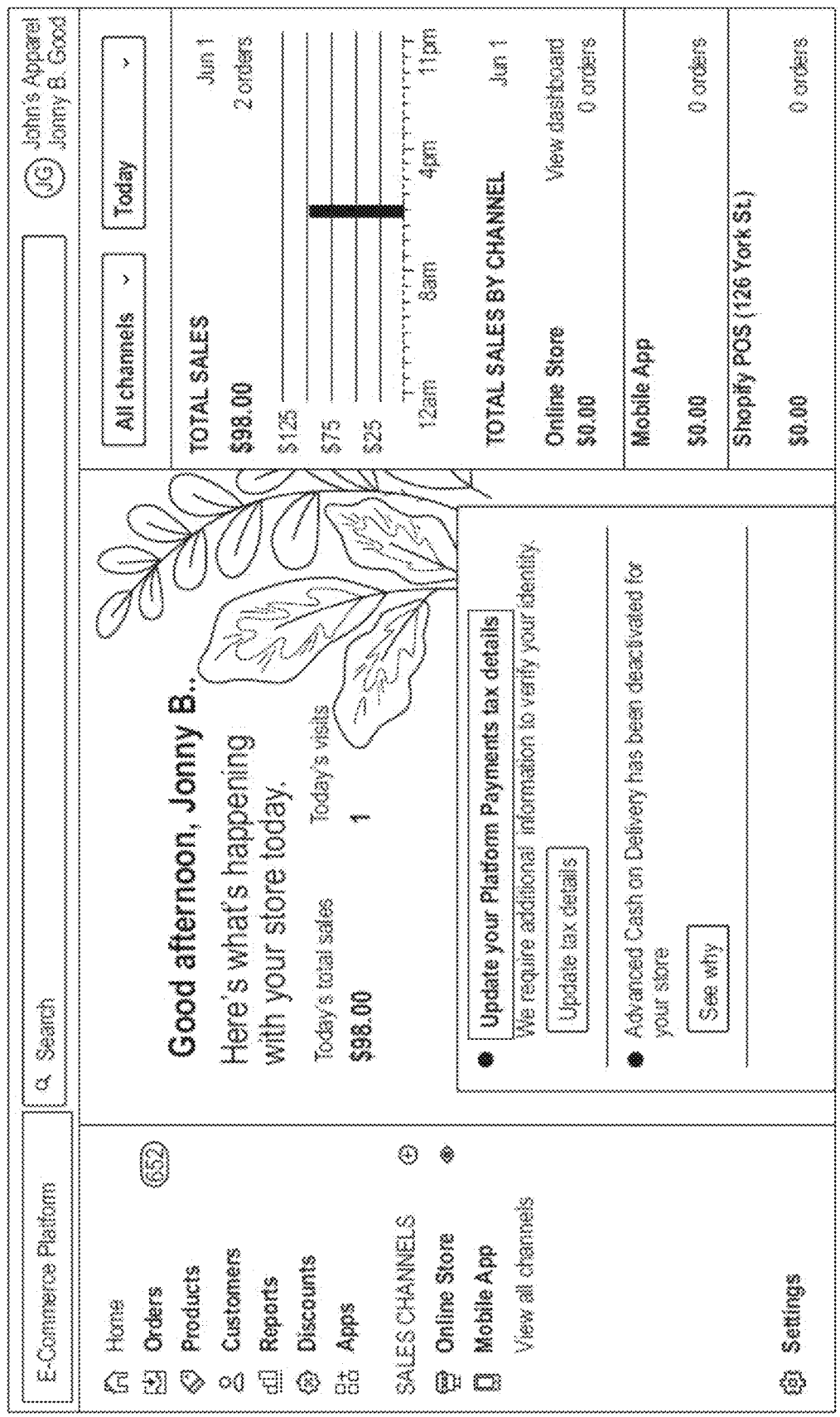
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Payment Gateways

As noted above, the checkout process often involves a payment processing job carried out, in part, by one of the payment gateways 106. Payment gateways 106 are third party servers that are used to receive payment requests, initiate payment processing with a payment processor and, in some cases, provide fraud checking on behalf of the merchant. In the description herein, the payment gateways 106 may be described as "processing payments"; however, it will be appreciated that the payment gateways 106 may not complete payment processing on their own. The payment gateway 106 is typically a first step in payment processing, and it may pass along payment information in a determined format to a specific payment processor to complete the payment processing. The payment gateway 106 then receives a success or failure message from the payment processor and prepares and sends a response message to the sender of the payment request.

The payment gateways 106 typically process the payments for a fee and/or a percentage cut of the transaction. In some instances, one or more of the payment gateways 106 may be provided by the e-commerce platform itself; however, in many cases, the payment gateway 106 is implemented by an external payment gateway provider and each payment gateway 106 may serve a large number of e-commerce platforms, individual merchants, and others.

Each payment gateway 106 may have its own characteristics in terms of the types of payments it processes, for example Mastercard™ credit card payments, Visa™ credit card payments, PayPal™ transactions, Apple Pay™ transactions, STAR™ debit transactions, Interac™ debit transactions, etc. Some payment gateways 106 may handle multiple types of payments; some may specialize in one type of payment. Some payment gateways 106 may have restrictions on certain types of transactions that it will not handle, e.g. product restrictions, transaction value limits, or other such restrictions. Some payment gateways 106 may be configured for higher throughput than other payment gateways 106. Each payment gateway 106 typically charges a fee, which may include a percentage of the total transaction value, for processing a payment and performing any fraud prevention/checking involved.

The e-commerce platform 100 may have a list of payment gateways 106 available for processing payments. In some cases, a merchant may designate a particular payment gateway 106 as their preferred gateway for processing transactions, or transactions of a particular type. The selection may often be based on the merchant's assessment of the payment gateway's reliability, speed, and cost. The e-commerce platform 100 and/or the merchant may have an ordered list of payment gateways 106 in order of preference. The order of preference may be based on cost or other factors.

At times, a payment gateway 106 may become overburdened with payment requests such that the response time from the payment gateway 106 becomes significantly long. In some cases, payment requests to the payment gateway 106 may time out without a response from the payment gateway 106. When the e-commerce platform 100 sends a payment request (e.g. a payment processing job) to a payment gateway 106 it may run a timer and determine that the payment gateway 106 is unresponsive if a response message is not received within a set period of time. In some cases, the time out may be determined after receiving an initial response to the payment request but before receiving a confirmation of payment message.

When one of the payment gateways 106 fails, times out, or refuses the request due to being overloaded, the e-commerce platform 100 may then attempt to identify a different payment gateway 106 to try. If the merchant or the e-commerce platform 100 has an ordered list of payment gateways 106, then it may try the next payment gateway 106 on the list. Each attempt may require that the e-commerce platform 100 wait to see whether the transaction will be accepted and completed before trying the next gateway. The cumulative delay may frustrate the customer and may lead to lost sales and/or disputes over payments.

In one aspect, the present application proposes methods and systems that attempt to address the problem with overloaded and/or unresponsive payment gateways through anticipation of potential load issues. In one aspect, the e-commerce platform may be configured to monitor the health of the available payment gateways so it has better information regarding their current status and can better manage the routing of transactions to avoid potential failures. In another aspect, the present application proposes methods and systems for anticipating load events. Various parameters may be factored into a determination that a particular merchant and/or a particular payment gateway is likely to experience a high load event involving a spike or surge in payment transactions requests. By determining or identifying an anticipated load event, the e-commerce platform may be able to better distribute the load by proactively allocating payment requests in such a manner that the likelihood of overburdening a specific payment gateway is reduced, thereby potentially avoiding or reducing failed payment transactions requests. The term "anticipated load event" refers to a payment request load event; i.e. a determination that one or more gateways is likely to receive a quantity of payment requests that are likely to exceed the capacity of the gateway(s), at least for a period of time.

Figure 3:
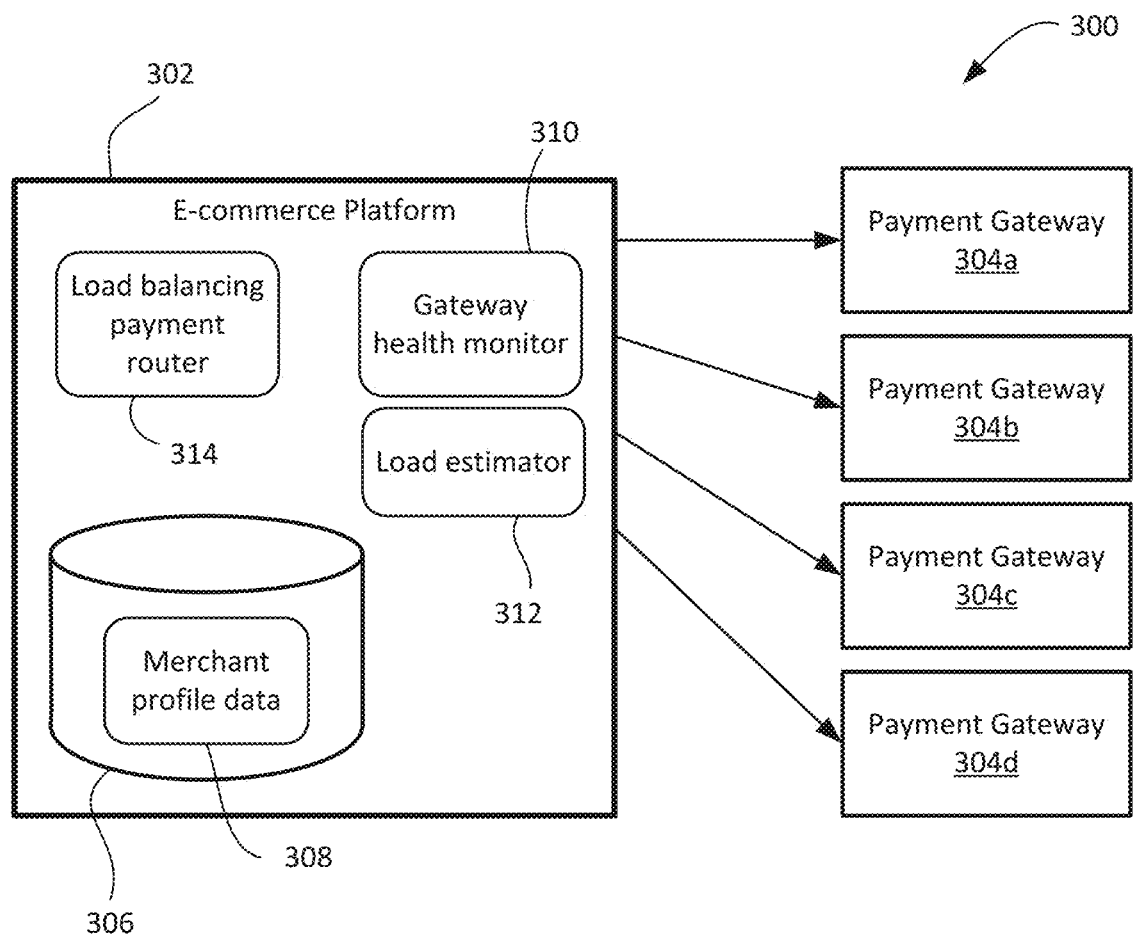
FIG. 3 illustrates an example system for payment processing.

FIG. 3 illustrates an example system 300 in block diagram form. The system 300 includes an e-commerce platform 302 and a plurality of payment gateways 304 (shown individually as 304a, 304b, 304c, 304d). The payment gateways 304 are third-party operated independent payment processing systems. The e-commerce platform 302 includes, among other things, data storage 306, which may contain various types of data including merchant data 308. The merchant data 308 may include data associated with the merchant(s) including preferred gateways for payment processing, etc.

The e-commerce platform 302 may include a gateway health monitor 310 that monitors the status of the payment gateways 304. As an example, the gateway health monitor 310 may obtain data regarding the current loads and response times of each of the payment gateways 304. In some cases, the payment gateway 304 may be configured to provide metrics in response to a health request message from the e-commerce platform 302. For example, using a publish-subscribe type of service, the e-commerce platform 302 may register with the payment gateway 304 to receive periodic messages from the payment gateway 304 providing current status information regarding the gateway. In some cases, the messages may be provided by the payment gateway 304 in reply to a request from the e-commerce platform 302.

The current health status information provided by the payment gateway 304 may vary from gateway to gateway depending on data it is configured to provided. In some cases, the payment gateway 304 may provide one or more of "current load", "current cap", average payment request handling time, scalability options, or other configuration data regarding the payment gateway 304. The current load may be a count of total current payment requests being processed by the payment gateway 304. The current load may be a count of received requests over a short recent time period, such as the past 10 seconds, 30 second, minute, or other window.

The current cap may be a pre-selected maximum number of payment requests that the payment gateway is configured to accept. For example, the payment gateway 304 may be configured to have a set maximum number of active payment requests. If the maximum is reached, then new payment requests may be automatically refused until processing of payments brings the count of active requests down below the maximum.

In some cases, the e-commerce platform 302 may measure response time of one of the payment gateways 304. As an example, the e-commerce platform 302 may use a common ping message to determine the round-trip response time of the payment gateway 304. In some cases, the e-commerce platform 302 may track the payment processing time for payment requests sent to each of the gateways (such as determining a payment processing time of one or multiple requests over a predetermined time period) to track the overall response times of each payment gateway 304. In cases where the payment gateway 304 does not provide current load information, the e-commerce platform 302 may attempt to infer health status from measured response times.

Based on information obtained from the payment gateways 304 and/or inferred from measured response times from the payment gateways 304, the e-commerce platform 302 may maintain a current status record for each of the payment gateways 304. The current status of a gateway 304 may include a measurement or estimation of the available capacity of the payment gateway 304.

The e-commerce platform 302 may further include a load estimator 312. The load estimator 312 is configured to anticipate potential or likely load events based on data available to the e-commerce platform 302. The data may include data regarding a specific merchant store and/or activity on the e-commerce platform 302 with regard to that merchant store and customers of that merchant. The data may also or alternatively include data regarding a plurality of merchant stores, e.g. overall merchant or customer activity on the e-commerce platform 302.

The load estimator 312 may be configured to identify potential load events, e.g. an anticipated spike or surge in payment requests. The load estimator 312 may identify these events using data regarding activity on the e-commerce platform 302, such as number of site visits, active shopping carts, count of selected product items, etc. In some cases, the load estimator 312 may use data from outside the e-commerce platform 302, such as information regarding significant calendar dates for purchasing, like Black Friday, or information regarding merchant-specific events, such as a planned flash sale, marketing campaign launch, or other such event.

The e-commerce platform 302 may further include a load balancing payment router 314. The load balancing payment router 314 may direct payment requests to one of the payment gateways 304. The selection of one of the payment gateways 304 may be based on the configured preferences of a merchant associated with the payment request and may, in some cases, depend on the type of payment or type of product.

The load balancing payment router 314 may receive information regarding payment gateway health from the gateway health monitor 310 and may receive anticipated load information from the load estimator 312. From this data, the load balancing payment router 314 may identify when an anticipated load event is likely to overwhelm a particular payment gateway 304a. As an example, the anticipated load event may project a certain number of payment requests in a certain time period in connection with a specific merchant. The available capacity at a preferred payment gateway for that merchant may be insufficient to handle the projected number of payment requests. Accordingly, the load balancing payment router 314 may identify an alternative payment gateway 304b and may proactively route at least some of the payment requests to the alternative payment gateway 304b to reduce the likelihood of the primary payment gateway 304a becoming overloaded. It will be appreciated that after identifying an anticipated load event for a specific merchant store on a primary payment gateway 304a, the load balancing payment router 314 may also proactively route payment requests from other merchant stores away from the primary payment gateway 304a and to an alternative payment gateway 304b.

It will be appreciated that although the gateway health monitor 310, the load estimator 312, and the load balancing payment router 314 are illustrated as separate elements for ease of explanation, they may be implemented as separate software applications or modules, or partially or completely together as one software application or module, or as part of a larger software application or module, within or outside the platform 302.

Figure 4:
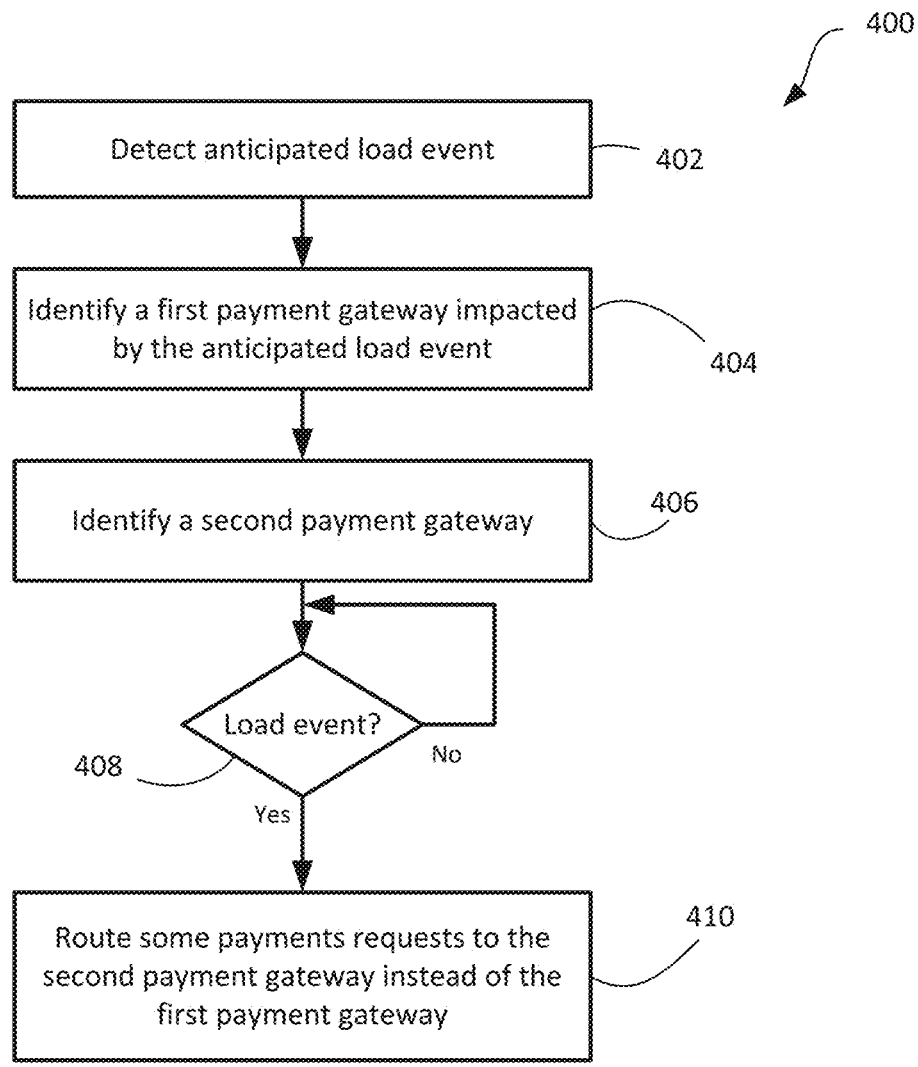
FIG. 4 shows, in flowchart form, one example method of load balancing payment requests.

Reference will now be made to FIG. 4, which shows, in flowchart form, one example method 400 of load balancing payment requests. The method 400 may be implemented by an e-commerce platform, which may include one or more computing devices with memory and processors executing computer-readable instructions to carry out the operations described. The e-commerce platform may serve a plurality of merchant accounts, including merchant storefronts or websites for retailing of product items, and providing payment services to the merchant accounts in connection with customer purchases of product items. The e-commerce platform communicates with a plurality of payment gateways, which serve to receive payment requests from the platform in connection with customer purchases and to manage payment processing and return confirmation or failure messages in connection with those payments.

In operation 402, the e-commerce platform detects an anticipated load event. As described above, the detection may include detecting the anticipated load event in connection with a specific merchant or in connection with the overall platform, i.e. with a plurality of merchants. The detection may be based on usage metrics on the e-commerce platform. As an example, a merchant storefront website may have more than a threshold number of active users browsing product items. Based on the count of active users exceeding the threshold number, the e-commerce platform may determine that the merchant is likely to experience a number of purchases sufficiently large and close enough in time to constitute a load event.

The detection of the anticipated load event may alternatively or additionally be based on a number of active shopping carts associated with a merchant, where a shopping cart is a data object reflecting that a customer, whether registered or "guest", has selected at least one product item for a prospective purchase but has not yet finished selecting items and has not yet completed the check-out process. In some cases, the count of active shopping carts includes only those for which the associated customer has an active session, since in some cases the e-commerce platform may be configured to store "abandoned" shopping carts so that they can be reconstituted when that same customer re-establishes a session with that merchant's customer interface (whether by website browser, dedicated app, or otherwise). In some cases, the count may include those stored carts for which there is no active session. The detection of the anticipated load event may alternatively or additionally be based on a count of product items in active shopping carts.

In some cases, the detection of the anticipated load event may be based on a count of active sessions by customers across all merchants on the platform. In some cases, the detection may alternatively or additionally be based on a count of active shopping carts and/or product items in shopping carts across all merchants on the platform. In some cases, the detection may include determining separate counts for groups of merchants that have the same designated primary payment gateway. That is, the platform may group merchants based on them using the same primary payment gateway and determine a count of active sessions and/or shopping carts with respect to that group of merchants. In some cases, the detection may include determining separate counts for groups of active shopping carts based on the payment gateway that would likely be used to process payment of the cart, which is determined by the payment gateway preference setting of the merchant as well as the type of product items in the cart.

In some implementations, the anticipated load event may be detected based on data external to activity on the e-commerce platform. For example, the anticipated load event may be based on information regarding a scheduled flash sale for a specific merchant store. The anticipated load event may be based on the launch of a marketing or advertising campaign, or connected to an upcoming celebrity endorsement. The anticipated load event may be based on a detected increase in social media mentions, follows or other such metrics regarding online activity associated with a merchant. The information may be obtained by the e-commerce platform from social media feeds, detected on merchant websites, set by an administrator, or otherwise. In some cases, the anticipated load event may be based on a calendar event. For example, Black Friday sales, Boxing Week sales, New Year's sale, or other such seasonal events may be the basis for detecting the anticipated load event.

In some cases, the anticipated load event may be based on historical data for a merchant. For example, a particular merchant may have a sales history that the e-commerce platform determines reveals an anticipated load event connected to certain calendar information or certain events. As an example, a merchant specializing in stationary and related products may have a historical spike in sales activity connected to the back-to-school timeframe.

In operation 404, the e-commerce platform identifies a first payment gateway impacted by the anticipated load event detected in operation 402. The identification of the first payment gateway may be based on having identified the anticipated load event in association with a specific merchant account, in which case the identification may be based on merchant data stored in association with the merchant account designated a primary payment gateway selected by that merchant. In the case where the e-commerce platform determines counts of active sessions or shopping carts for groups of merchants that use the same primary payment gateway, the identification of the gateway may have been completed in operation 402. In a case where the detection of the anticipated load event is based on a cross-platform assessment of active users or shopping carts, then identification may include determining which of the plurality of gateways are likely to be sent payment requests based on the designated preferences of the merchant accounts. In any such cases, the identification may further include comparing the anticipated load event information with primary payment gateway health status information. For example, the anticipate load event may have an associated quantity of payment requests expected, or expected over a timeframe, and the primary payment gateway health status information may indicate an available capacity at the first payment gateway. The identification in operation 404 may include comparing those numbers to determine that the first payment gateway lacks the capacity to handle the anticipated load event.

In operation 406, the e-commerce platform identifies a second payment gateway. The identification may be based on an ordered list of preferences set for a merchant account associated with the anticipated load event. In some cases, the identification may further include determining from payment gateway health status information the available capacity of payment gateways on the ordered list and selecting the highest ranked gateway that has sufficient available capacity. In some cases, the identification may be based on knowledge of previous routing decisions for the same anticipated load event, to avoid the scenario where other payment gateways become overwhelmed due to rerouted payments from an anticipated load event on a primary payment gateway.

Operation 408 includes determining that the load event is occurring. This determination may be presumed based on the detected anticipated load event, in some cases. That is, no further determination occurs beyond detecting the anticipated load event. In some cases, the determination that the load event is occurring may be based on detecting an increase in payment requests on the e-commerce platform, or in connection with a specific merchant, above a determined level.

In operation 410, the e-commerce platform routes at least some payment requests to the identified second payment gateway instead of using the first payment gateway. Note, that the routing does not involve trying the first payment gateway first and then re-routing a payment request based on a failure at the first payment gateway. The routing of payment requests to a second payment gateway instead of the first payment gateway may be selectively applied to payment requests associated with particular merchants. For example, if a specific merchant is having flash sale that is the basis for the anticipated load event, then the e-commerce platform may selectively route payments requests for that merchant to the second payment gateway instead of the first payment gateway, and may continue to send payment requests from other merchants to the first payment gateway, since the merchant that is the source of the load event may be more willing to support the possible higher costs associated with the second payment gateway in order to adequately support its flash sale event.

Figure 5:
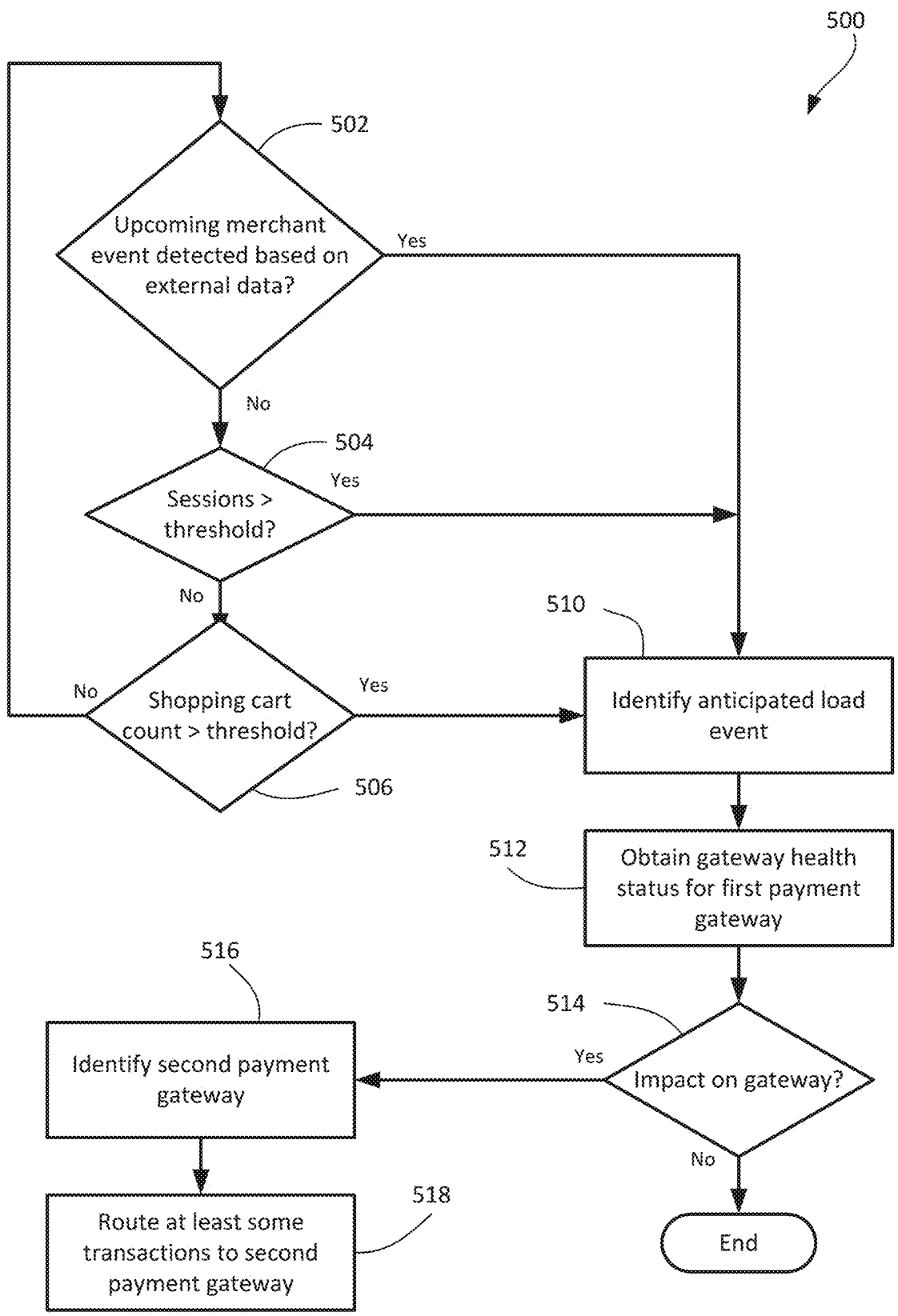
FIG. 5 shows, in flowchart form, another example method of load balancing payment requests.

Reference is now made to FIG. 5, which shows a more detailed example flowchart illustrating an example method 500 for load balancing payment requests. In this example method 500 the determination of the anticipated load event is based on any one of a number of possible metrics. In operation 502, the e-commerce platform determines whether external data indicates a likely load event. As noted above, this may include detecting a significant increase in social media mentions, information regarding an advertising campaign launch, information regarding a scheduled flash sale, etc.

In operation 504, the e-commerce platform determines whether a count of customer sessions for a merchant store exceeds a first threshold. In the case of an online website, this may include a count of active browser sessions for example. In the case of a dedicated merchant app for customer purchases, it may include a count of active sessions with remote devices. It may include an aggregation of counts from more than one sales channel.

In operation 506, the e-commerce platform determines whether a count of active shopping carts having at least one item exceeds a second threshold. The second threshold may be the same as, or lower than, the first threshold. An active shopping cart containing at least one item may be a stronger indicator of a present intention to purchase than an active session.

If any of operations 502, 504, or 506 result in determination that the data indicates a possible load event, then in operation 510 an anticipated load event is identified. The anticipated load event is associated with a specific merchant in this example method 500. The anticipated load event that is identified in operation 510 may include determining a magnitude of the anticipated load event. That is, a prospective number of payment requests may be estimated. The estimate may be based on the count of sessions, the count of shopping carts, or other data. In some cases, it may be based on historical data for similar anticipated load events.

In operation 512, the e-commerce platform obtains gateway health status information for a first payment gateway. The first payment gateway may be the primary gateway selected by the merchant account for processing of payments relating to purchases from the merchant. The health status information may include current load data, available capacity data, current average failure rate of requests, current average request response time, current average payment processing time, ping response time, or other such data. It may include configuration data for the payment gateway, such as whether the payment gateway has scaling options for increasing capacity and timelines associated with implementing a capacity increase.

The e-commerce platform may then assess in operation 514 whether the anticipated load event is going to negatively impact the first payment gateway. For example, it may compare the magnitude of the anticipated load event to the available capacity of the payment gateway to determine whether sufficient capacity is available to handle the load event. If so, then the method 500 ends. If not, then the method 500 proceeds to operation 516 where the e-commerce platform identifies a second payment gateway. As noted above, the second payment gateway may be identified based on an ordered list of gateways specified by the merchant account. The identification may further take into account health status information for the payment gateways on the list.

In operation 518, the e-commerce platform routes at least some payment transactions to the second payment gateway instead of the first payment gateway. In some cases, the e-commerce platform routes only a portion of the payment requests relating to the merchant to the second payment gateway. The portion may be based on the capacity of the first payment gateway. That is, the e-commerce platform may send a number of payment requests to the first payment gateway selected based on not exceeding the available capacity and may send any excess payment requests over that number to the second payment gateway. In some cases, the e-commerce platform may send all payment requests for the merchant to the second payment gateway in operation 518 in order to preserve any remaining capacity at the first payment gateway for merchants not experiencing a load event.

As described above, in some situations the identification of a first payment gateway and a second payment gateway may be based, at least in part, on merchant-specific preferences. That is, the merchant account may have associated payment gateway selection information, which in some cases may include an ordered list of preferred payment gateways having a least two entries.

Figure 6:
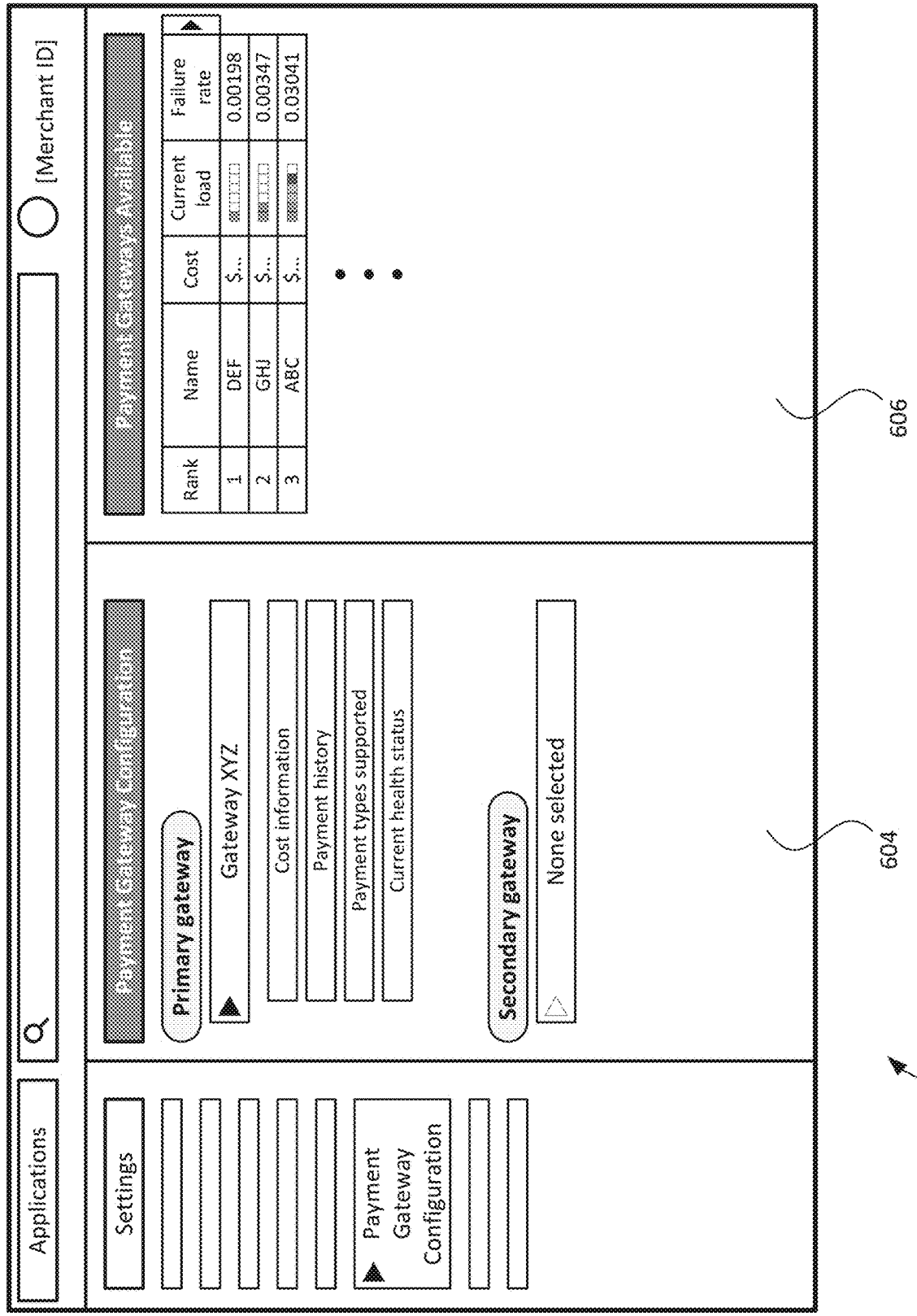
FIG. 6 illustrates an example merchant account interface.

The e-commerce platform may, in some cases, provide merchants with the ability to configure payment gateway selections through a merchant account interface. FIG. 6 illustrates one example merchant account interface 600. A merchant may log in to the e-commerce platform via a merchant device, such as from a desktop computer or mobile device, and manage aspects of their online store and other configurations. In some embodiments, the merchant may be provided with the merchant account interface 600 to enable configuration of payment gateway preferences. In this example, the merchant account interface 600 may include a navigation menu 602, one option of which may be payment gateway configuration, and a payment gateway configuration section 604. The payment gateway configuration section 604 may permit the selection of a primary gateway and a secondary gateway. In some cases, tertiary gateways or others may be selected. In selecting a gateway, such as the primary payment gateway, the merchant may be permitted to select the payment gateway from a pull down menu of available gateways. In some cases, the section 604 may provide information regarding the selected payment gateway, such as cost information, payment history, payment methods supported, and/or current health status information for the payment gateway. In some instances, the section 604 may provide the merchant with configuration options, such as the ability to set a timeout value, number of retries, and other settings in connection with determining that a request to the payment gateway has failed.

In this example, the interface 600 further includes a payment gateway information panel 606 in which the e-commerce platform provides the merchant with health status information, cost information, and/or failure data regarding the available set of payment gateways. In some cases, the panel 606 may enable sorting of the list of payment gateways based on, for example, cost, current load, failure rate, failure rate in peak periods, failure rate in non-peak periods, average number of retries, scalability options, or other metrics.

Figure 7:
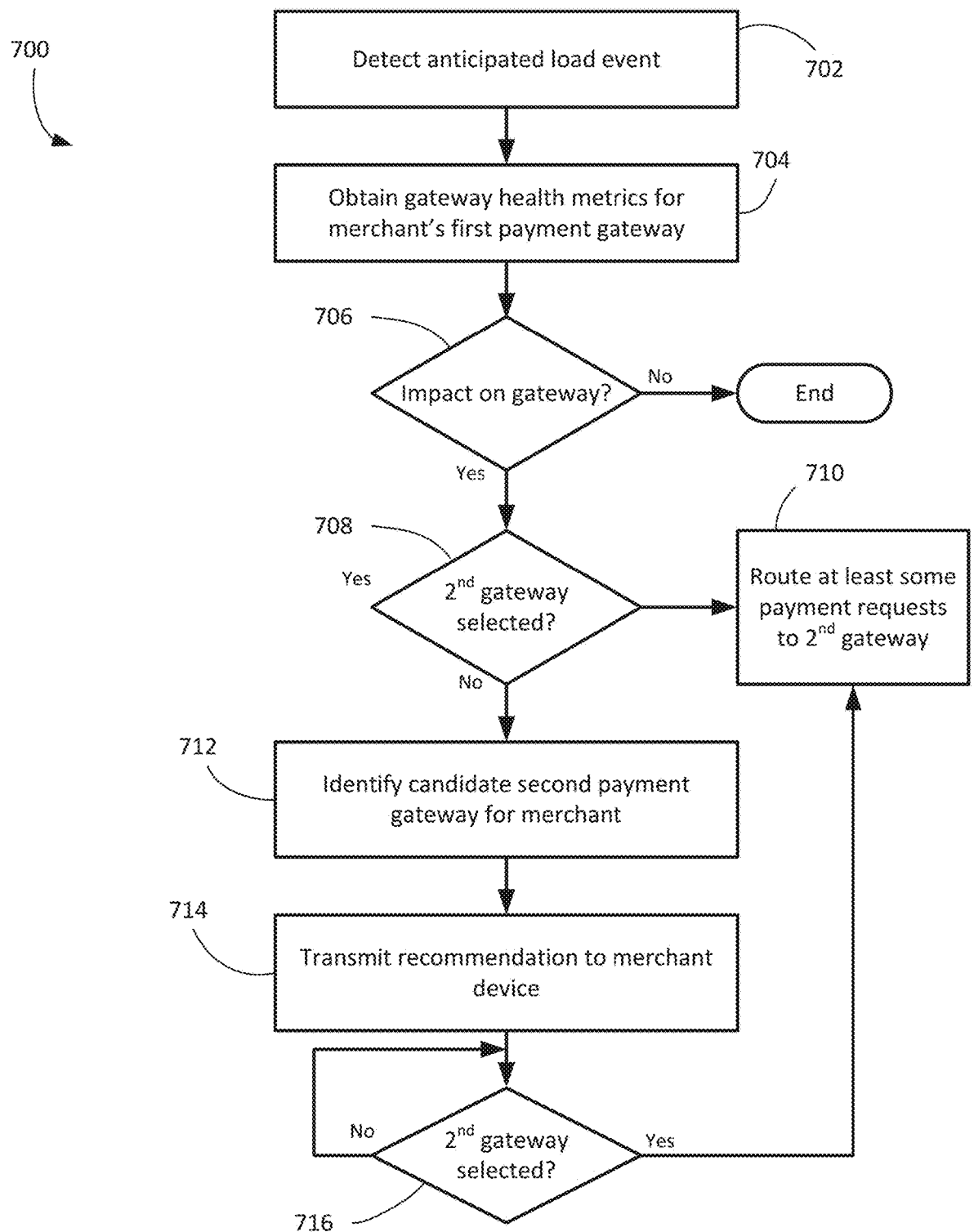
FIG. 7 shows, in flowchart form, a further example method of load balancing payment requests.

Reference will now be made to FIG. 7, which shows, in flowchart form, another example method 700 of load balancing payment requests by an e-commerce platform.

In operation 702, the e-commerce platform detects an anticipated load event. As described above, detection of the anticipated load event may be based on activity detected on the e-commerce platform and/or external source data. In this example, the anticipated load event is associated with a specific merchant that has a merchant account on the e-commerce platform.

Once the e-commerce platform detects an anticipated load event, then in operation 704 it identifies the first payment gateway associated with the merchant account and obtains payment gateway health information relating to that payment gateway. The first payment gateway may be identified based on a designated payment gateway identifier stored in association with the merchant account. In some cases, the first payment gateway may be default payment gateway rather than one actively designated by the merchant. The payment gateway health information may have previously been collected by the e-commerce platform, such as by the gateway health monitor 310 (FIG. 3). The information may be obtained from reports on status provided by the first payment gateway, or may be inferred by the e-commerce platform based on response times to payment requests, ping messages, or the like.

Based on the first payment gateway health information and the anticipated load event, the e-commerce platform determines in operation 706 whether the load event will have a significant impact on the first payment gateway. The platform may compare available capacity at the gateway with a count of likely payment requests associated with the anticipated load event to determine whether the expected quantity of payment requests will exceed the available capacity at the first payment gateway and result in timed-out or failed payment requests. If not, then the method 700 ends. Otherwise, the e-commerce platform determines whether the merchant has a designated second payment gateway in operation 708.

If the merchant has a designated second payment gateway, then in operation 710 the e-commerce platform implements load balancing using the second payment gateway. The load balancing includes routing at least some payment requests to the second payment gateway instead of to the first payment gateway. If the merchant does not have a designated second payment gateway, then in this example, the e-commerce platform identifies a candidate second payment gateway for the merchant in operation 712. The platform may identify the candidate from the plurality of payment gateways based on one or more factors. For example, the platform may identify the candidate gateway based on lowest cost. In another example, the platform may identify the candidate gateway based on available capacity. In a further example, the platform may identify the candidate gateway based on throughput, average response time, failure rate, peak failure rate, average number of retries, or other health metrics. In yet a further example, the platform may identify the candidate gateway based on payment types supported. For instance, in one implementation the e-commerce platform may select a candidate second payment gateway by identifying a subset of candidate gateways that support a certain payment type or types that are supported by the first payment gateway and then identifying the candidate with the highest throughput. An optimization expression or formula may be used to weight a number of factors to sort and select the candidate in some cases.

Once a candidate second payment gateway has been identified, if any, then in operation 714 the e-commerce platform may transmit a recommendation message to a merchant device. The recommendation message may signal to the merchant that an anticipated load event was identified by the e-commerce platform and that a second payment gateway should be designated by the merchant. If a candidate second payment gateway was identified by the platform in operation 712, then the candidate second payment gateway may be presented to the merchant in the recommendation message. The recommendation message or a link or other activation element within the message may cause launch of an interface, such as the merchant account interface 600 (FIG. 6), through which the merchant is able to select a second payment gateway. In some cases, the merchant may be given the option of confirming the selection of the candidate second payment gateway or, if declined, given the option of selecting from a list of other payment gateways available. The interface may provide information regarding the current health of each gateway, its cost, payment types, etc.

As indicated by operation 716, once a second payment gateway is confirmed or selected by the merchant, the merchant device signals the e-commerce platform, and the e-commerce platform proceeds to implement load balancing using the second payment gateway in operation 710.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method of load balancing payment requests among payment gateways, the method comprising:
  determining, based on a usage metric for an e-commerce platform, a projected number of payment requests expected to be received during a future time period;
  identifying a first payment gateway to be impacted by determining that the projected number of payment requests exceeds an available capacity measure at the first payment gateway;
  identifying a second payment gateway; and
  during the future time period, transmitting at least some payment requests to the second payment gateway instead of to the first payment gateway.

2. The computer-implemented method of claim 1, wherein the projected number of payment requests expected to be received comprise a predicted number of requests expected over the future time period.

3. The computer-implemented method of claim 1, wherein the anticipated load event is associated with a first merchant and wherein identifying the second payment gateway includes identifying the second payment gateway based on a priority ranking of gateways associated with the first merchant.

4. The computer-implemented method of claim 3, wherein the at least some payment requests include payment requests associated with the first merchant, and wherein, during the future time period, the method includes transmitting at least some payment requests associated with other merchants to the first payment gateway.

5. The computer-implemented method of claim 3, wherein the at least some payment requests include payment requests associated with merchants other than the first merchant, and wherein, during the future time period, the method includes transmitting payment requests associated with the first merchant to the first payment gateway.

6. The computer-implemented method of claim 1, wherein identifying the second payment gateway includes identifying one or more merchants having the first payment gateway as a primary gateway and the second payment gateway as a secondary gateway, and wherein transmitting includes transmitting payment requests associated with the one or more merchants to the second payment gateway.

7. The computer-implemented method of claim 1, wherein transmitting includes selecting, from a set of received payment requests, the at least some payment requests for transmission to the second payment gateway instead of to the first payment gateway, and wherein the selecting is based on a payment type.

8. The computer-implemented method of claim 1, wherein transmitting includes selecting, from a set of received payment requests, the at least some payment requests for transmission to the second payment gateway instead of to the first payment gateway, and wherein the selecting is based on merchant preferences.

9. The computer-implemented method of claim 1, wherein transmitting includes selecting, from a set of received payment requests, the at least some payment requests for transmission to the second payment gateway instead of to the first payment gateway, and wherein the selecting is based on a product type associated with the payment requests.

10. The computer-implemented method of claim 1, wherein the projected number of payment requests is associated with a first merchant, and wherein identifying the second payment gateway includes sending a notification to the first merchant providing two or more candidate payment gateways other than the first payment gateway, and receiving, in response, a selection of the second payment gateway.

11. The method of claim 1, wherein the available capacity measure is based on a health metric regarding the first payment gateway, and the heath metric regarding the first payment gateway is different from the usage metric of the ecommerce platform.

12. A system for load balancing payment requests among payment gateways, the system comprising:
  a processor; and
  a memory storing computer-executable instructions that, when executed by the processor, are to cause the processor to:
    determine, based on a usage metric for an e-commerce platform, a projected number of payment requests expected to be received during a future time period;
    identify a first payment gateway to be impacted by determining that the projected number of payment requests exceeds an available capacity measure at the first payment gateway;
    identify a second payment gateway; and
    during the future time period, transmit at least some payment requests to the second payment gateway instead of to the first payment gateway.

13. The system of claim 12, wherein the anticipated load event is associated with a first merchant and wherein the instructions, when executed, are to cause the processor to identify the second payment gateway by identifying the second payment gateway based on a priority ranking of gateways associated with the first merchant.

14. The system of claim 13, wherein the at least some payment requests include payment requests associated with the first merchant, and wherein, during the future time period, the instructions, when executed, are to further cause the processor to transmit at least some payment requests associated with other merchants to the first gateway.

15. The system of claim 13, wherein the at least some payment requests include payment requests associated with merchants other than the first merchant, and wherein, during the future time period, the instructions, when executed, are to further cause the processor to transmit payment requests associated with the first merchant to the first gateway.

16. The system of claim 12, wherein the instructions, when executed, are to cause the processor to identify the second payment gateway by identifying one or more merchants having the first payment gateway as a primary gateway and the second payment gateway as a secondary gateway, and wherein the instructions, when executed, are to cause the processor to transmit by transmitting payment requests associated with the one or more merchants to the second payment gateway.

17. The system of claim 12, wherein the instructions, when executed, are to cause the processor to transmit by selecting, from a set of received payment requests, the at least some payment requests for transmission to the second payment gateway instead of to the first payment gateway, and wherein the selecting is based on a payment type.

18. The system of claim 12, wherein the instructions, when executed, are to cause the processor to transmit by selecting, from a set of received payment requests, the at least some payment requests for transmission to the second payment gateway instead of to the first payment gateway, and wherein the selecting is based on merchant preferences.

19. The system of claim 12, wherein the instructions, when executed, are to cause the processor to transmit includes selecting, from a set of received payment requests, the at least some payment requests for transmission to the second payment gateway instead of to the first payment gateway, and wherein the selecting is based on a product type associated with the payment requests.

20. The system of claim 12, wherein the projected number of payment requests is associated with a first merchant, and wherein the instructions, when executed, are to cause the processor to identify the second payment gateway by sending a notification to the first merchant providing two or more candidate payment gateways other than the first payment gateway, and receiving, in response, a selection of the second payment gateway.

21. A non-transitory computer-readable medium storing processor-executable instructions for load balancing payment requests among payment gateways by an e-commerce platform, wherein the instructions, when executed by one or more processors, are to cause the one or more processors to:
- determine, based on a usage metric for an e-commerce platform, a projected number of payment requests expected to be received during a future time period;
- identify a first payment gateway to be impacted by determining that the projected number of payment requests exceeds an available capacity measure at the first payment gateway;
- identify a second payment gateway; and
- during the future time period, transmit at least some payment requests to the second payment gateway instead of to the first payment gateway.

* * * * *